June 19, 1928.
W. L. MARDEN
1,673,880
LIQUID DISPENSING APPARATUS
Filed May 22, 1925
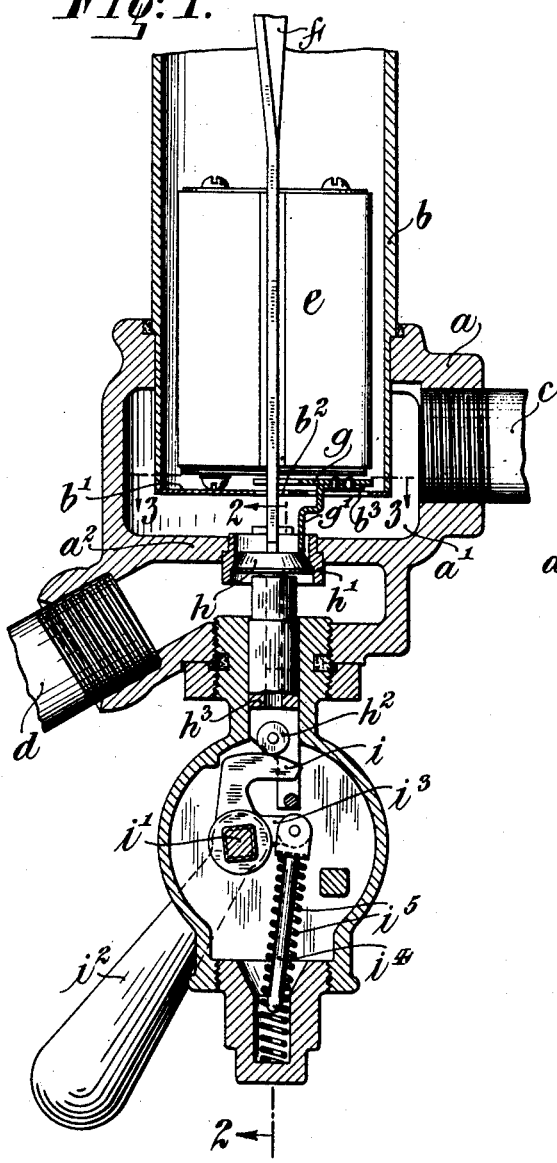
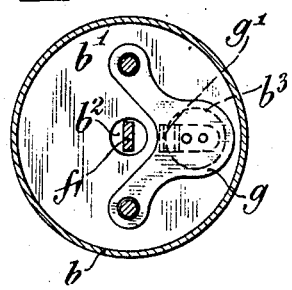
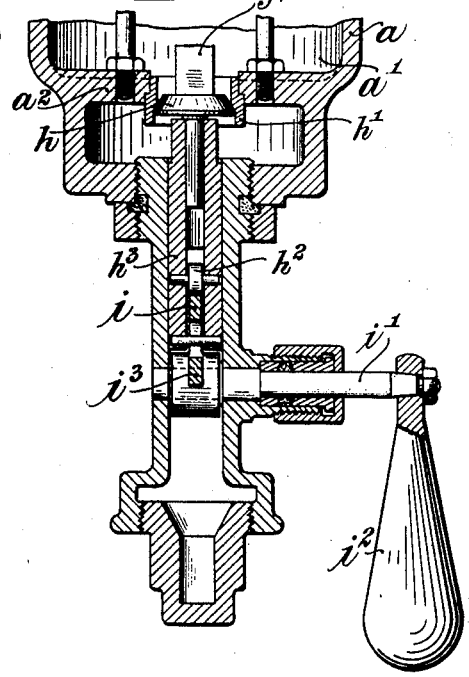
Inventor
William L. Marden
By his Attorneys
Redding, Greeley, O'Shea & Campbell Patented June 19, 1928.

1,673,880

UNITED STATES PATENT OFFICE.

WILLIAM L. MARDEN, OF ELMHURST, NEW YORK, ASSIGNOR TO NEPTUNE METER COMPANY, OF NEW YORK, N. Y., A CORPORATION OF NEW JERSEY.

LIQUID-DISPENSING APPARATUS.

Application filed May 22, 1925. Serial No. 32,014.

In some forms of liquid dispensing apparatus, such as that sometimes used, for example, in the dispensing of gasoline, the liquid is delivered by a pump into a metering vessel provided with a float by the movement of which a register is actuated and at the same time the customer may be informed as to the quantity of liquid delivered. The flow of liquid from the metering vessel is controlled by a valve, the opening of which by the attendant permits the liquid in the metering vessel to be delivered into a gasoline tank or other receptacle provided by the customer. Heretofore the metering vessel, usually cylindrical, has permitted the unrestricted flow of the liquid at its lower end when the delivery valve has been opened, with the result that the suction of the rapidly discharged liquid has pulled the float down below the level of the liquid in the vessel, resulting in inaccurate indication. To overcome this defect in operation the lower ends of the metering vessel or indicating tube, in the improved apparatus herein described, is closed except for a restricted opening, preferably about the center, so that the liquid is drawn more slowly and the float is not pulled down unduly but falls with the liquid. Such a restricted opening, however, would retard too much the filling of the metering vessel or indicating tube and there is therefore provided in the bottom of the vessel a valve which is opened during the filling of the vessel and is closed during the discharge of the liquid from the vessel. As the discharge of the liquid is controlled by a valve operated by the attendant, which valve is closed during the filling of the vessel, advantage is taken of the necessary movement of such delivery valve, as it moves to closed position, to open the valve through which the vessel is charged or filled. The invention will be explained more fully hereinafter with reference to the accompanying drawing in which an embodiment of the invention is illustrated and in which:

Figure 1 is a view in vertical central section of so much of a liquid dispensing apparatus as is necessary to enable the invention to be understood.

Figure 2 is a view also in vertical central section on a plane at right angles to that of Figure 1, indicated by the broken line 2—2 of Figure 1.

Figure 3 is a detailed view in horizontal section on the plane indicated by the broken line 3—3 of Figure 1.

In the embodiment of the invention illustrated a suitable casting $a$ receives a metering vessel or indicating tube $b$ and has connected thereto an inlet pipe $c$ and a discharge pipe $d$ by which the liquid is delivered to the customer. In this instance a float $e$ in the vessel $b$ engages a spirally twisted and rotatably mounted rod $f$ by which the register is actuated as is well understood. The lower end of the vessel $b$ is partly closed by a diaphragm $b^1$ which has at $b^2$ a restricted opening through which the liquid escapes from the vessel and is preferably central, and a larger opening $b^3$ through which the vessel is charged with the liquid from the inlet pipe $c$ through the chamber $a^1$. During the discharge of the liquid from the vessel the larger opening $b^3$ is closed by a valve $g$ which then rests on the diaphragm $b^1$, but during the filling or charging of the vessel $b$ the valve is opened, as by lifting. This might be accomplished by the liquid itself, but it is accomplished preferably by the movement of the delivery valve $h$, which, during the filling of the vessel $b$ is seated by upward movement against the seat formed at $h^1$ in the diaphragm $a^2$ of the casing $a$, and at the proper time is opened by the attendant for the delivering of the liquid from the metering vessel to the customer.

Heretofore the delivery valve had been held to its seat by a powerful spring which acted directly on the valve stem and had to be overcome by the application of considerable force on the handle by which the delivery valve was opened. In the present instance, however, the closing movement of the valve is effected by a cam $i$ which acts against a friction wheel $h^2$ carried by the valve stem $h^3$. The cam $i$ is carried by a spindle $i^1$ which has an operating handle $i^2$ and a short arm $i^3$ which is acted upon by a spring pressed plunger $i^4$, the spring $i^5$ of which is comparatively light so that, although it is sufficient to move the cam $i$ to close the valve $h$ and hold it closed normally, its resistance can be overcome easily through the handle $i^2$ when the valve $h$ is to be permitted to open.

As stated above, it is preferable to take advantage of the movement of the valve $h$ to open the valve $g$ during the filling or charging of the vessel $b$, as at such time the valve $h$ must have been moved to closed position. Accordingly the valve $g$ is provided with a finger $g^1$ which is extended downwardly through the opening $b^3$ into such position with respect to the valve $h$ that the valve $g$ shall be opened as the valve $h$ approaches its seat, whereby the flow of the liquid into the vessel $b$ will be comparatively unrestricted. At the time of delivery of the liquid, however, the valve $h$ must be moved from its seat and therefore will permit the valve $g$ to close the opening $b^3$, thereby compelling the liquid to find its way somewhat slowly from the vessel and therefore avoid the pulling down of the float $e$ which would take place if the liquid were permitted to escape rapidly from the vessel. The size of the aperture $b^2$ is such as to prevent the flow therethrough from becoming too sluggish and thereby defeating the purpose of the invention. It is restricted sufficiently to cause the degree of restriction, represented by the size of the filling opening, to be just sufficient to overcome the suction caused by the flow of the liquid in the chamber $a'$.

It will be understood that various changes in detail of the construction and arrangement can be made to suit different conditions of use and that the invention, except as pointed out in the accompanying claims, is not restricted to the precise construction shown and described herein.

I claim as my invention:

1. In a liquid dispensing apparatus, a metering or indicating vessel, a float therein, an inlet and a discharge pipe in operative relation therewith, a delivery valve associated with the discharge pipe, said vessel having a restricted discharge opening and a relatively free filling opening, the said openings being independent of the delivery valve, and a valve cooperating with the filling opening to close the same during the discharge of liquid from the vessel.

2. In a liquid dispensing apparatus, a metering or indicating vessel, a float therein, an inlet and a discharge pipe in operative relation therewith, a delivery valve associated with the discharge pipe, said vessel having a restricted discharge opening and a relatively free filling opening, the said openings being independent of the delivery valve, a valve cooperating with the filling opening to close the same during the discharge of the liquid from the vessel, and means to open the last named valve during the filling of the vessel.

3. In a liquid dispensing apparatus, a metering or indicating vessel, a float therein, said vessel having a restricted discharge opening and a relatively free filling opening, a valve co-operating with the filling opening during the discharge of the liquid from the vessel, an inlet and discharge pipe in operative relation to said openings, a delivery valve associated with the discharge pipe, and means to open the first named valve when the delivery valve is closed.

4. In a liquid dispensing apparatus, a metering or indicating vessel, a float therein, an inlet and a discharge pipe in operative relation therewith, said vessel having a restricted discharge opening and a relatively free filling opening, a valve cooperating with the filling opening to close the same during the discharge of the liquid from the vessel, a delivery valve associated with the discharge from the vessel, and a finger extended from the first named valve into operative relation with the delivery valve whereby the first named valve is opened as the delivery valve is closed.

5. In a liquid dispensing apparatus, a metering vessel, a valve to control the discharge of liquid from the metering vessel, a cam in operative relation with the valve to close the same, a spindle by which the cam is carried, an operating handle on the spindle, an arm on the spindle and a spring-pressed plunger in operative relation with the arm to rotate the spindle to cause the cam to close the valve.

6. In a liquid dispensing apparatus, a metering vessel, an inlet and a discharge pipe therefor, a delivery valve for controlling the flow through the discharge pipe and means operable by the delivery valve for restricting the flow of the outgoing liquid from the metering vessel when the delivery valve is open and facilitating the flow of incoming fluid when the same is closed.

This specification signed this 19th day of May, A. D. 1925.

WILLIAM L. MARDEN.